Patented Oct. 7, 1930

1,777,839

UNITED STATES PATENT OFFICE

ANTONIO FERRETTI, OF MILAN, ITALY, ASSIGNOR TO SOCIETÁ INVENZIONI BREVETTI ANONIMA TORINO, OF TURIN, ITALY

TREATING OF ANIMAL-SKIN PRODUCTS

No Drawing. Original application filed May 24, 1929, Serial No. 365,780, and in Italy July 14, 1928. Divided and this application filed July 15, 1930. Serial No. 468,129.

This invention relates to a process of treating animal skin products or animal skin materials, as distinguished from the treatment of wool, hair, etc., and has for one of its objects the provision of a process adapted for utilizing untanned hides, scraps and cuttings therefrom as well as scraps and cuttings from tanned hides, whereby such materials may be converted into a useful and valuable product which in appearance, fibrous texture and flexibility resembles natural leather.

It will be apparent that my invention is of great economical value in that it salvages or utilizes materials which heretofore have generally been converted into glues or fertilizers or simply thrown away.

In the practice of my invention, when treating untanned animal skin materials or tanned animal skin products, scraps and cuttings therefrom, the fibers of the material are intimately and mechanically admixed with an aqueous medium until a thin flowing slurry of the fibers in aqueous suspension is obtained. The proportion of aqueous medium to the material being treated is necessarily large so as to obtain the desired thin flowing mass or slurry.

I next add to the slurry a tanning agent which may be a natural or synthetic vegetable tanning agent, a fiber lubricant and a suitable binding material containing a water insoluble binder, the binding material prior to coagulation of the binder being miscible with water, for example india-rubber latex, gutta percha latex, balata latex, or the like, as obtained from the trees and which may have been preserved by ammonia or any other suitable alkaline preserving material. A synthetic latex or other binding material containing a water insoluble binder and which is in suitable condition for incorporation in the slurry may be substituted for the lattices above mentioned.

A suitable substance such as a vegetable tannin may be employed for preserving the binding material in the product. This vegetable tannin may be employed alone for a tanning agent as well as a preservative, but when a mineral tanning agent is employed vegetable tanning is employed also. Amongst the vegetable tannins I preferably employ those of the pyrogallic series, more particularly sumac. So far as mineral tanning agents are concerned I can employ particularly those containing chromium.

A suitable fiber lubricant, that is, an oil or grease emulsifiable in water such as a sulfurated oil, for example, is added to the slurry either before, during, or after the addition of the tanning agent.

When a soft fiinished product is desired I add pure or impure glucose or a mixture of glucose and dextrine, or dextrine, or potato starch, or other leather nourishing substances to the slurry, or to the tanning agent, or to the grease.

The slurry is then caused to flow upon a finely perforated support such as a wire gauze and the liquid of the slurry abstracted to obtain a fibrous sheet. The material thus obtained is then rolled and pressed, and subjected to the usual finishing operations employed in the finishing of natural leathers.

This application is a division of my copending application Serial No. 365,780, filed May 24, 1929.

What I claim is:—

The process which comprises adding a tanning agent, grease and potato starch to a flowing aqueous slurry containing the fibrous portions of animal skin products in suspension, adding a water insoluble binder and a preservative therefor to the slurry, and abstracting the liquid of the slurry.

This specification signed this 21st day of June, 1930.

ANTONIO FERRETTI.